May 5, 1964 G. W. McCARTY ETAL 3,131,947
MASONRY DRILLING APPARATUS HAVING VACUUM DUST-COLLECTING SYSTEM
Filed Nov. 25, 1960
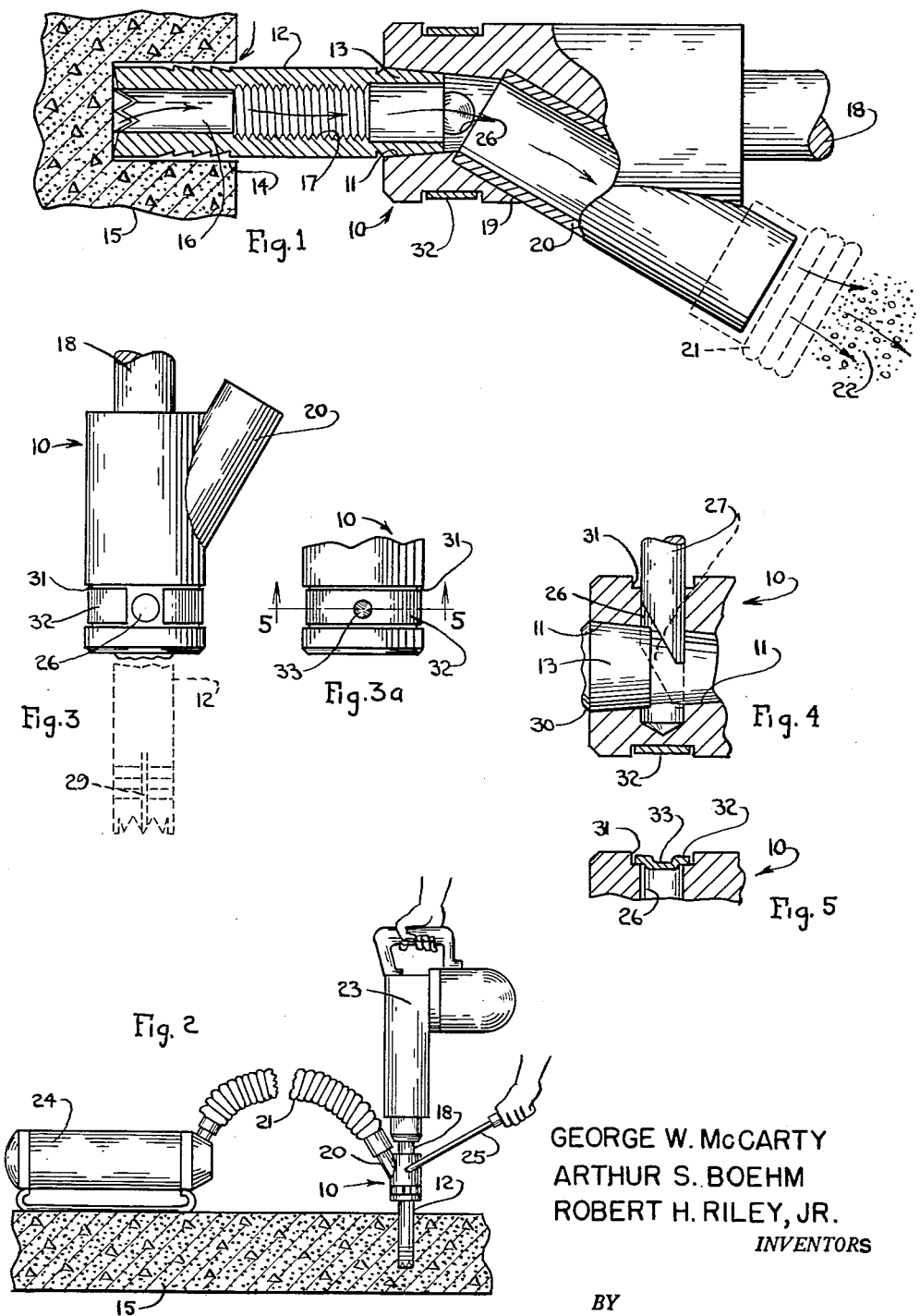
GEORGE W. McCARTY
ARTHUR S. BOEHM
ROBERT H. RILEY, JR.
*INVENTORS*
BY
*Leonard Bloom*
ATTORNEY

United States Patent Office 3,131,947
Patented May 5, 1964

3,131,947
MASONRY DRILLING APPARATUS HAVING
VACUUM DUST-COLLECTING SYSTEM
George W. McCarty, Timonium, and Arthur S. Boehm and Robert H. Riley, Jr., Towson, Md., assignors to The Black and Decker Manufacturing Company, Towson, Md., a corporation of Maryland
Filed Nov. 25, 1960, Ser. No. 71,691
4 Claims. (Cl. 279—103)

The present invention relates to masonry drilling apparatus having a vacuum dust-collecting system, and more particularly, to such apparatus utilizing a hollow masonry drill bit.

Heretofore, in the prior art relating to masonry drilling apparatus, especially of the type utilizing a hollow drill bit and actuated by a continuous impacting or hammering, the pulverizing action of the drill bit invariably generated a plethora of chips, material pieces, and dust particles, which usually accumulated and remained within the hollow drill bit or within the hole being drilled; hence, the drilling rate was retarded and inefficient, and the drilled hole usually required a cleaning thereof subsequent to the drilling operation.

Accordingly, it is an object of the present invention to alleviate these difficulties by providing masonry drilling apparatus having a vacuum-actuated system for the egress of chips and dust particles from the hole being drilled.

It is another object of the present invention to provide masonry drilling apparatus utilizing a hollow type of masonry drill bit, wherein the chips and dust particles pass internally of the drill bit under the influence of a source of suction.

It is yet another object of the present invention to provide a hollow masonry drill bit chucked within a tool body, the latter having internal passageways for coupling the interior of the drill bit to a source of suction.

It is still another object of the present invention to provide efficient masonry drilling apparatus that may be produced quickly and economically.

In accordance with the teachings of the present invention, masonry drilling apparatus is provided utilizing a hollow type of masonry drill bit chucked within a socket of a tool body; and means are provided to couple the opposite end of the tool body to a driving tool, whereby a continuous impacting or hammering is imparted to the drill bit. The tool body is provided with an externally-accessible internal passageway communicating with the interior of the hollow drill bit; and means are provided to couple the passageway of the tool body to a source of vacuum, whereby the chips and dust particles generated in the drilling operation are passed within the hollow drill bit through the tool body to the source of vacuum. Moreover, the tool body is further provided with an auxiliary transverse passageway accessible externally of the tool body and communicating internally with a portion of the socket; and when the drill bit is chucked within the tool body, the shank portion of the drill bit extends internally of the tool body and slightly beyond the socket thereof to protrude partially within the auxiliary transverse passageway, whereby means may be inserted within the auxiliary transverse passageway to eject the shank of the drill bit from the tool body subsequent to the completion of the drilling operation. Means are further provided to normally seal off the auxiliary transverse passageway so as not to interfere with the suction that is generated by the source of vacuum.

These and other objects of the present invention will become apparent from a reading of the following specification, taken in conjunction with the enclosed drawings, in which:

FIGURE 1 is a view, partially in section and partially in elevation, of the tool body of the present invention and hollow drill bit chucked therein, showing the communication between the interior of the drill bit and a source of vacuum;

FIGURE 2 is a pictorial view of the overall masonry drilling apparatus in actual usage;

FIGURE 3 is a view of the tool body in elevation, showing the opening leading to the auxiliary transverse passageway, and further showing a typical masonry drill bit in phantom and in exploded relationship to the tool body;

FIGURE 3a is a partial elevational view corresponding to that of FIGURE 3, but showing (in its adjusted position) the means to normally seal off the auxiliary transverse passageway;

FIGURE 4 is a partial plan view of the apparatus of FIGURE 1, showing the wedging means to eject the shank of the drill bit from the tool body; and FIGURE 5 is a partial sectional view taken along the lines 5—5 of FIGURE 3a.

With reference to FIGURE 1, there is illustrated a tool body 10, which preferably is cylindrical, and which is provided with an internally-tapered socket 11. A hollow masonry drill bit 12 has a shank portion 13 which may be seated or chucked within the socket 11 by a slight tapping action. The bit 12 may be a conventional anchor-type of expendable self-drilling masonry drill bit, which is adapted to form a hole 14 in a block of concrete 15 or similar building materials; but it should be noted that other types of drill bits are feasible for use with the present invention, provided of course, that the drill bit 12 is hollow, that is to say, is furnished with a continuous internal longitudinal passageway 16. Moreover, the type of masonry drill bit 12 (shown in the drawings for ease of illustration) may be provided with internal threads 17 for the purpose of ultimately receiving a bolt or stud therein. The opposite end 18 of the tool body 10 is adapted to be coupled to a suitable driving tool, in any convenient manner that is well-known in the art, to ultimately impart a series of impacts or blows to the drill bit 10. Moreover, the tool body 10 is provided with an internal inclined passageway 19, communicating with the passageway 16 of drill bit 12 through socket 11. A tube 20 is inserted within the inclined passageway 19 and is rigidly secured therein by brazing or other suitable means; but it should be understood, that if desired, the tube 20 may be formed integrally with the tool body 10. The tube 20 protrudes externally of the tool body 10, and a vacuum hose 21 is coupled thereto, as shown in phantom view in FIGURE 1.

Hence, it will be appreciated that the chips, material pieces, and dust particles (illustrated generally as at 22)— which, as hereinbefore related, are generated in the breaking up or pulverizing action of the drill bit 12—are caused, under the influence of a powerful suction force, to be removed from the hole 14 by passing interiorly of the drill bit 12, tool body 10, and tube 20 in the direction indicated by the small arrows. Consequently, by thus precluding the chips from otherwise clogging the drill bit 12, the drilling operation is greatly accelerated; and moreover, the hole 14 requires no cleaning subsequent to the drilling operation thereof and prior to the usual reinsertion of the particular type of masonry drill bit 12 shown in FIGURE 1.

With reference to FIGURE 2, the tool body 10 is coupled to a suitable driving tool, such as a conventional portable electric hammer 23; while the vacuum hose 21, which is coupled to tube 20 of tool body 10, leads to a conventional heavy-duty vacuum cleaner 24. Moreover, a conventional hand-actuated turning wrench 25 may be provided for slightly moving or oscillating the tool body 10 and drill bit 12 occasionally during the drilling operation in a manner well-known in the art.

With reference to FIGURES 3 and 4, the tool body 10 is further provided with an externally-accessible auxiliary transverse passageway 26, which communicates internally with socket 11, and which (as shown in FIGURE 4) may be non-continuous with respect to the tool body 10. Moreover, the shank 13 of drill bit 12, when seated in socket 11 of tool body 10, extends internally of the tool body and slightly beyond socket 11 to protrude partially within the auxiliary transverse passageway 26. Hence, it will be appreciated that any suitable means, such as a wedging tool 27, may be inserted within the auxiliary transverse passageway 26 and rotated slightly to eject the shank 13 of drill bit 12 from tool body 10. For clarity of illustration, only a part of the wedging tool 27 has been shown (in full), while the alternate (or ejection) position of the wedging tool 27 is shown in phantom view as contacting the shank 13.

The use of a masonry drill bit 12 as illustrated in the drawings is well-known in the prior art. Briefly, the bit 12 is used to drill out a hole 14 in a block of work material 15, such as concrete; and subsequent to the drilling operation, the bit and driving tool are removed from the hole 14, and a tapered plug (not shown) is inserted in the end of the bit 12. The bit 12 is then reinserted into the hole 14 and is driven therein by the hammer 23, and the tapered plug spreads the ends of the bit 12 by reason of the lanced slots 29. When the drill bit 12 is thus anchored, the shank 13 thereof is broken off by the operator exerting a lateral strain upon the relief 30. Hence, the shank 13 remains within the socket 11 of tool body 10 and must be ejected in the manner as hereinbefore described.

Of course, it is to be understood that the tool body 10 of the present invention may be used in conjunction with a variety of masonry drill bits, expendable or otherwise, but in each case some means must be provided to eject the shank of the bit from the tool body 10; thus the previous description (relating to an expendable anchor-type of masonry drill bit 12) serves to illustrate the point.

Moreover, as shown more particularly in FIGURES 3, 3a, and 5, means are herein provided to normally seal off the opening of the auxiliary transverse passageway 26 so as not to interfere with the suction generated by the vacuum cleaner 24 during the drilling operation. More specifically, an external annular recess 31 is formed on the tool body 10 to communicate with the opening of the auxiliary transverse passage 26, and a spring-tensioned steel band 32 is seated within a circumferential portion of the recess 31. Suitable keying means, such as a dimple 33 shown in FIGURE 3a, is provided to cooperate with the opening in the passageway 26 so as to allow the band 32 to be snapped into place; thus, the band 32 normally seals off the opening of the auxiliary transverse passageway 26 to preclude any interference with the operation of the vacuum cleaner 24 during the drilling operation. After the drilling operation has been completed, and when it is desired to remove the shank 13 of the drill bit 12 from the tool 10 in the manner as hereinbefore related, the spring band 32 may be adjusted circumferentially within the external annular recess 31 (by exerting a slight manual force against the action of the dimple 33) to uncover the opening in the auxiliary transverse passageway 26. Thereafter, the band 32 may be manually re-adjusted to its normal position.

Thus, it is seen that the apparatus of the present invention alleviates the difficulties of the prior art by providing a masonry drilling apparatus that utilizes a vacuum-actuated system for the egress of chips and dust particles from the hole being drilled, the passage of the chips and dust particles being internally of the drill bit and tool body therefor; and the overall result is such as to greatly accelerate the drilling operation and at the same time provide a clean, smooth hole.

Obviously, many modifications may be made without departing from the basic spirit of the present invention; and therefore, within the scope of the appended claims, the invention may be practiced other than has been specifically described.

We claim:

1. A tool for installing a hollow, self-drilling anchor shell in a masonry or the like surface comprising, an elongate, substantially cylindrical chuck body having an axial passageway opening to one end of the chuck body only for engaging a shell therein and means at the opposite end of the chuck body for releasably coupling the body to a percussive driving tool, said chuck body having a first transverse passageway at a slanted angle relative thereto fully intercepting said axial passageway internally of said chuck body and opening laterally only to the circumference of the body and a second transverse passageway between said open end of the chuck body and said first transverse passageway intersecting said axial passageway for receiving an end portion of the shell therein when the shell is engaged in said open end of said passageway, said second transverse passageway adapted to receive an ejector member therein to engage said end portion for axially ejecting the shell from the chuck body, said chuck body having means for securing a handle thereto for axial back and forth rotation of the chuck body concurrently with driving of the shell and means for securing a source of vacuum in communication with said first transverse passageway for discharging debris entering said axial passageway during installation of the shell.

2. A tool for installing a hollow, self-drilling anchor shell in a masonry or the like surface comprising, an elongate, substantially cylindrical chuck body having an axial passageway opening to one end of the chuck body only for engaging a shell therein and means at the opposite end of the chuck body for releasably coupling the body to a percussive driving tool, said chuck body having a first transverse passageway at a slanted angle relative thereto fully intercepting said axial passageway internally of said chuck body and opening laterally only to the circumference of the body and a second transverse passageway between said open end of the chuck body and said first transverse passageway intersecting said axial passageway for receiving an end portion of the shell therein when the shell is engaged in said open end of said passageway, said second transverse passageway adapted to receive an ejector member therein to engage said end portion for axially ejecting the shell from the chuck body, said chuck body having means for securing a handle thereto for axial back and forth rotation of the chuck body concurrently with driving of the shell and means for securing a source of vacuum in communication with said first transverse passageway for discharging debris entering said axial passageway during installation of the shell comprising, a rigid hollow extension protruding outwardly of the circumference of the chuck body and connected with said opening of the first transverse passageway.

3. A tool for installing a hollow, self-drilling anchor shell in a masonry or the like surface comprising, an elongate, substantially cylindrical chuck body having an axial passageway opening to one end of the chuck body only for engaging a shell therein and means at the opposite end of the chuck body for releasably coupling the body to a percussive driving tool, said chuck body having a first transverse passageway at a slanted angle relative thereto fully intercepting said axial passageway internally of said chuck body and opening laterally only to the circumference of the body and a second transverse passageway between said open end of the chuck body and said first transverse passageway intersecting said axial passageway for receiving an end portion of the shell therein when the shell is engaged in said open end of the passageway, said second transverse passageway adapted to receive an ejector member therein to engage said end portion for axially ejecting the shell from the chuck body, said chuck body having means for securing a handle thereto for axial back and forth rotation of the chuck body concurrently with driving of the shell and means for securing a source of vacuum in communication with said first transverse passageway for discharging debris entering said axial passageway during installation of the shell, and means movably secured on said body for movement between a first position uncovering said second transverse passageway to permit insertion of the ejector member and a second position overlying the passageway for sealing same when the ejector member is removed.

4. Masonry drilling apparatus having a vacuum dust-collecting system and comprising a substantially-cylindrical elongated chuck body having a blind axial passageway opening to one end of the body for receiving the shank of a hollow drilling tool therein; means for releasably coupling the opposite end of said chuck body to a percussive drilling tool; a handle secured to said chuck body intermediately of said last-named means and the rear portion of said blind axial passageway, whereby said handle and said chuck body may be oscillated conjointly during the drilling operation; a first transverse passageway formed in said chuck body and inclined with respect to said axial passageway, one end of said first transverse passageway communicating with the blind rear portion of said axial passageway internally of said chuck body, and the other end opening to the cylindrical surface of said chuck body; a tube secured within said first transverse passageway and extending beyond said chuck body, whereby said tube may be connected with a source of vacuum for removing dust particles during the drilling operation; a second transverse passageway formed in said chuck body intermediately of said first transverse passageway and the said one end of said chuck body; said second transverse passageway being formed substantially at right angles to said axial passageway, communicating therewith, and opening to the cylindrical surface of said chuck body, whereby an ejection tool may be inserted within said second transverse passageway, subsequent to the drilling operation, for removing the shank of the drilling tool from said chuck body; and a member frictionally engaging said chuck body for normally covering the opening of said second transverse passageway during the drilling operation, said member being manually releasable to uncover said second transverse passageway, subsequent to the drilling operation, for removal of the tool shank.

References Cited in the file of this patent

UNITED STATES PATENTS

| | | |
|---|---|---|
| 1,084,152 | Kessel | Jan. 13, 1914 |
| 1,278,427 | Bocorselski | Sept. 10, 1918 |
| 1,392,702 | Phillips | Oct. 4, 1921 |
| 1,786,029 | Phillips | Dec. 23, 1930 |
| 2,224,063 | Roberts | Dec. 3, 1940 |
| 2,801,614 | Dieterich et al. | Aug. 6, 1957 |
| 2,834,577 | Feucht | May 13, 1958 |
| 2,854,238 | Kennell | Sept. 30, 1958 |
| 2,918,260 | Tilden | Dec. 22, 1959 |
| 3,070,382 | Dieterich | Dec. 25, 1962 |